United States Patent Office 3,053,897
Patented Sept. 11, 1962

3,053,897
PROCESS FOR FORMING ALKALI ALCOHOLATES OF TRIALKANOLAMINES
Francis E. Clark, San Gabriel, and Kenneth Walter Newman, Van Nuys, Calif., assignors, by mesne assignments, to Purex Corporation, Ltd., a corporation of California
No Drawing. Filed Jan. 29, 1959, Ser. No. 789,777
5 Claims. (Cl. 260—584)

This application is a continuation-in-part of our copending application, Serial No. 511,116, filed May 25, 1955, and now abandoned.

This invention relates to improvements in the removal of rust and light heat scale from ferrous bodies.

Alkaline solutions of polyalkanolamines and particularly triethanolamines are particularly useful in removal of rust and light heat scale from mild steel and from iron.

Thus, solutions of high alkalinity in excess of pH 13, for example, containing about 4% to about 40% or higher of alkali in solution in the form of alkali metal hydroxides, and containing from 4 to about 35% of a trialkanolamine, such as triethanolamine, and at least about 25% water, are active derusting solutions which also remove light heat scale such as is produced on heat treating of steels, particularly mild steels.

It has also been shown by others that the derusting and descaling ability of these materials are improved by the addition of the salts of the aliphatic hydroxy acids, such as lactic, citric, tartaric, gluconic, glyceric, malic, glycolic and saccharic acid.

Such reagents particularly when employing these salts are also useful in removal of leaded deposits formed on engine parts burning fuels containing lead compounds.

The types of scale formed on these engine parts include leaded scale, such scale being composed essentially of lead compounds such as the oxides and halides of lead, e.g. $PbO$, $PbO_2$, $Pb_2O_3$, $Pb_3O_4$, and under some conditions some free lead, and $PbX_2$ where X is a halogen such as chlorine or bromine and in many cases it may also include other salts such as phosphates and carbonates. Such deposits are also found on certain component parts of the piston type of internal combustion engines powered by leaded fuels. These salts will vary in color from white to yellow, orange, red, and brown. The composition of the deposit depends in large part on the composition of the fuel and the atmospheric environment in which it is burned, for example, fuels containing tetraethyl lead, organic halides and organic phosphates, such as tricresyl phosphates.

These deposits are also modified by organic additives which enter the combustion chamber, especially in reciprocating engines, with the lubricant and which combine with the lead to form various components of the deposits. Deposits thus formed by burning of fuels containing lead compounds are in this specification and these claims referred to as "leaded deposits."

Leaded deposits are thus formed at elevated temperatures because of the presence of lead-containing and anti-knock compounds in aviation (or other) fuel, and such deposits are frequently formed on metal surfaces which are covered with heat scale with which the leaded deposits are commingled and on which the leaded deposits may be found.

Also formed on the surface of the engine parts is a tough carbon or graphite scale which tightly adheres to the metal surfaces. The description of these scales as carbon or graphite scales is not intended to exclude the presence in the carbon deposit of high molecular weight asphaltene or asphaltic or tarry binders which are formed in the burning of the fuel. These deposits are found both intermingled with and deposited on the heat scale and leaded deposits. In many cases massive carbon deposits are formed because of severe conditions of engine operation, especially in the case of "hot" spots.

In addition to their ability to remove carbonaceous deposits, leaded deposits, rusts, and light heat scale these reagents are highly useful in removal of paints, varnishes, lacquers, including the synthetic resin types, gums, asphalt, tars, and other carbonaceous deposits.

One of the difficulties with such aqueous solutions is that they are liquid and being highly alkaline are corrosive to many ingredients and difficulties in packaging are thus presented. They also present certain health hazards to workers. If they are to be formulated on the job from the ingredients, care should be taken to obtain uniform solutions.

We have found that the mixtures may be made in solid form in such manner that they may be readily dissolved in water solution to give a suitable solution of the desired reactivity for the above purposes. Such mixtures can be prepared to be of uniform composition and random samples may be readily dissolved to obtain uniform and reproducible compositions. Additionally, they may be packaged and distributed like any other dry highly alkaline powder.

We have discovered that a mixture of substantially anhydrous flake or granular alkali metal hydroxide when intimately mixed with an alkanolamine, using preferably at least about one gram mol of alkali metal hydroxide per gram atom of replaceable hydrogen of the alkanol radicals of the alkanolamine, generates considerable heat and the slurry turns solid with the production of a crystalline material.

The following examples illustrates the procedure:

*Example 1*

3 mols of flake KOH (anhydrous) was dispersed in 1 mol of liquid triethanolamine at room temperature under constant stirring. The reaction is vigorous and heat is generated. The mixture tends to cake and vigorous stirring is required to keep the mass pulverized. The addition of from 1 to 2 mols of water to the trialkanolamine prior to the addition of the alkali facilitates the start of the reaction.

*Example 2*

Heat may be used in place of the water as in Example 1 to facilitate the initiation of the reaction.

Thus, three mols of flake KOH (anhydrous) was dispersed in the liquid triethanolamine. The slurry mixture was heated to 190° F. with vigorous and constant agitation. Heating was discontinued but the temperature continued to rise. The slurry rapidly turns to a fine crystalline powder. The mixture may then be allowed to cool to room temperature.

The above products produced as in Examples 1 and 2 are extremely hygroscopic and quickly pick up moisture and become damp and soupy. They are thus not suitable for packaging and distribution.

We have, however, been able to produce these materials as a dry powder which remains stable and dry and has a long shelf-life by incorporating desiccant compounds into the material. Preferably we employ alkaline materials for this purpose. We may also incorporate wetting agents, preferably solid wetting agents, which are stable under the highly alkaline conditions of the mixtures. Such materials may be the alkali metal salts of the fatty acids, preferably of the soap forming acids of chain length not longer than caprylic, or the alkali metal salts of the sulfonated fatty acids, sulfonated petroleum naphthenates, and aryl alkyl sulfonic acids.

*Example 3*

1 mol of fatty acid such as caprylic acid was reacted with 2½ mols of triethanolamine. The resulting liquid was cooled to 100° F. At this point 8–12 mols of dry flake anhydrous KOH was added. The mixture was agitated and when the temperature had risen to 120° F., one mol of sodium carbonate containing no water of crystallization ($Na_2CO_3$) was added slowly and the mixture thoroughly stirred and then an additional 8½ mols of sodium carbonate was added to the mixture slowly with constant stirring. The final composition was cooled to below 100° F. and this resulted in a fine dry powder that could be safely packaged.

*Example 4*

Instead of using the above carbonate we may use a greater proportion of the carbonates containing less than 10 molecules of water of crystallization or any other alkali stable desiccating material which will take up water present in or hygroscopically absorbed by the reactive mixture, provided that the material will not react with the products of the reaction or deleteriously affect the cleaning process.

A particularly useful material is excess caustic particularly NaOH which is capable of picking up water of crystallization.

We may thus in the procedure of Example 1 gradually add about 10 to 20 mols of dry NaOH to 1 mol of triethanolamine. The solidification occurs after about 3 mols of NaOH is added and the final addition of the excess of caustic is accomplished by mixing of the dry reaction product and the excess caustic.

If desired we may add either to the product of Examples 1, 2, and 3 some salts of the hydroxy aliphatic carboxylic acids which have been shown to be highly effective in improving the activity of alkaline solutions of alkanolamines in removing rust, heat scale, and leaded deposits. Such salts include the alkali metal salts, e.g., sodium or potassium salts of the hydroxy aliphatic acids referred to above.

Thus, we may also add in addition to the excess NaOH, as described above, some of the above-mentioned salts and mix them thoroughly to give a dry powder suitable for packaging as a dry powder.

An example of such composition may be made by mixing 68.7 parts by weight of NaOH with 17.6 parts by weight of triethanolamine and 1.7 parts by weight of sodium glycolate and 12.0 parts by weight of sodium gluconate. We may, if desired, also mix thoroughly with the above powders a wetting agent such as described above, for example, from 0.5 to 3 parts by weight of sodium salt of alkyl aryl sulfonate or sodium salt of caprylic acid.

*Example 5*

One-half pound of the material produced as in Example 3 was dissolved in 1 gallon of water and a piece of heavily rusted iron was treated in the solution at 180° F. About 20 of the rust was removed in 5 minutes and about 75% of the rust was removed after 15 minutes. No substantial improvement in rust removal was obtained by more prolonged treatment under the above conditions.

*Example 6*

Two pounds of the material produced as in Example 3 was dissolved in 1 gallon of water. A piece of iron referred to in Example 5 and similarly rusted was immersed in the above solution and heated at 180° F. About 90% of the heavy rust was removed after 5 minutes and after 15 minutes treatment the iron was clean of rust. The same solution completely derusted a similar piece of rusted iron in 5 minutes at 210° F.

*Example 7*

The composition of Example 4 was dissolved in water to give a solution having an analysis equivalent to

|  | Percent by weight |
|---|---|
| Sodium hydroxide | 8.2 |
| Triethanolamine | 2.1 |
| Sodium glycolate | 0.3 |
| Sodium gluconate | 1.4 |

The above composition as given does not exclude the possibility that some or all of the alkanolamine is combined as alcoholate with some of the alkali.

A heavily rusted mild steel strip of metal was completely derusted when heated in the above solution for 10 to 20 minutes at 200° F.

The following example illustrates the effectiveness of the above compositions as paint removers:

*Example 8*

A piece of iron coated with a primer coat, over which had been placed an undercoat and the undercoat covered with a heavy duty bus paint was completely denuded of paint and gave a bright metallic surface by immersion of the painted metal in the material at the concentration of Example 5 for 5 minutes.

Thus, when employing the composition of Example 3 a concentration of ½ pound per gallon is sufficient where paint only is to be removed, as in Example 5, but where paint and rust are to be removed concentrations of 1 to 2 pounds per gallon as in Example 7 are preferred.

In formulating the composition of matter we may use a trialkanolamine wherein each of the alkanol groups is formed from a lower alkyl chain having at least two carbon atoms, such as an alkyl chain having two to four carbon atoms, as for example, triethanolamine, tripropanolamine, e.g. triisopropanolamine, and tributanolamines. Instead of the pure components we may use the technical grades. Thus, commercially available triethanolamine, which because of the availability and reactivity, is particularly desirable, contains some mono- and diethanolamines and some grades may contain polyethoxyethanolamines as impurities. Such materials are suitable for the above purpose. The amount of the alkali employed is preferably at least equivalent to the replaceable hydroxyl hydrogens of the alkanol radicals.

We may use any of the alkali metal hydroxides but prefer to employ NaOH or KOH because of price and reactivity.

The compositions so formulated have many uses. Thus in addition to their highly effective action for removal of ordinary rusts produced by the atmospheric corrosion of iron and mild steels, they also have a descaling effect on the oxide coatings formed in heat treating of alloy steel or produced by exposure of alloy steels to high temperature under oxidizing conditions, particularly if the oxide coating is not too heavy or too severely glazed or is otherwise of refractory nature, in which case the scales may be only partially removed when treated in the above manner for practical periods of time.

It is also useful in brightening non-ferrous metals such as lead-tin solders and nickel and copper and alloys of nickel and copper.

In addition to the removal of paints, varnishes, and lacquers, the compositions of our invention are also effective in removing carbonaceous deposits formed on engine parts of internal combustion engines of the piston type and of the turbo-jet or jet type. Excessively dense and graphitic deposits not removable by the composition of our invention may be removed by incorporating in the mixture polyalkanolpolyamines in place of or together with the trialkanolamines.

In carrying out the process of forming the solid reaction product of the alkali metal hydroxide and the alkanolamine, the reaction is completed practically as soon as the mixture of reaction ingredients is completed. Prolonged heating is not required. For this reason it is our belief that the product formed is the alcoholate salt of the alkanolamine. Preferably, but not necessarily, we may employ one mol of hydroxide for each replaceable hydrogen of the hydroxyl group of the alkanol radicals. The preferred procedure is to add sufficient solid alkali hydroxide to replace the hydroxyl hydrogens of each alkanol group. We do not desire to cause an oxidation of the alkanol radicals, and therefore, we carry out the reaction in substantially anhydrous form. We employ but a minimum of water when added to the alkanolamine to catalyze the reaction, and do not continue the reaction at elevated temperatures for prolonged periods of time, but interrupt the reaction when the solid reaction product is produced, and allow the product to cool to room temperature.

Thus, we believe the reaction product produced by the Examples 1 to 4, inclusive, to be the tripotassium alcoholate of triethanolamine, to wit: $(KOC_2H_4)_3N$, although some of the triethanolamine may not be completely reacted, thus $(KOC_2H_4)_2(HOC_2H_4)N$ and $$(KOC_2H_4)(HOC_2H_4)_2N$$

may also be present.

Instead of triethanolamine, we may employ tripropanolamine, such as tri-isopropanolamine, or the di-alkanolamine analogue thereof, for example, diethanolamine or di-propanolamine. The alkali metal alcoholates of the polyalkanolpolyamines may also be produced, e.g., the alcoholates of N,N,N',N' tetra-kis (2-hydroxypropyl) ethylene diamine or the 2-hydroxyethyl analogue thereof, and the alcoholates of tetraethanol propylene diamine, pentaethanol diethylene triamine, and hexaethanol triethylenetetramine.

While we have described particular embodiments of our invention for purposes of illustration, it should be understood that various modifications and adaptations thereof may be made within the spirit of the invention as set forth in the appended claims.

We claim:

1. A method for forming the alkali alcoholates of an alkanolamine, which comprises: vigorously stirring a mixture of a trialkanolamine wherein each of the alkanol groups is formed from a lower alkyl chain having 2 to 4 carbon atoms and a substantially anhydrous alkali metal hydroxide in the mol ratio of at least about one gram mol of alkali metal hydroxide per gram atom of replaceable hydroxyl hydrogen in each alkanol radical and producing a dry powder as a reaction product of the above mixture.

2. A method as set forth in claim 1, wherein said mixture further includes water in the mol ratio of about one to two mols of water to three mols of alkali metal hydroxide.

3. The method comprising intimately mixing while vigorously stirring triethanolamine and substantially anhydrous alkali metal hydroxide in the proportions of at least about 3 mols of alkali metal hydroxide to about 1 mol of triethanolamine and producing a dry powdered reaction product of the chemical interaction of the said triethanolamine and said alkali metal hydroxide.

4. The method comprising intimately mixing while vigorously stirring triethanolamine mixed with water and substantially anhydrous alkali metal hydroxide in the proportions of at least about 3 mols of alkali metal hydroxide to about 1 mol of triethanolamine, said water being in the proportion of one to two mols of water to said three mols of alkali metal hydroxide and producing a dry powdered reaction product of the chemical interaction of the said triethanolamine and said alkali metal hydroxide.

5. The method comprising intimately mixing while vigorously stirring triethanolamine and substantially anhydrous alkali metal hydroxide in the proportions of at least about 3 mols of alkali metal hydroxide to about 1 mol of triethanolamine, heating the reaction mixture, producing a dry powdered reaction product of the chemical interaction of the said triethanolamine and said alkali metal hydroxide, discontinuing said heating, and cooling the resulting dry powdered reaction product.

References Cited in the file of this patent

UNITED STATES PATENTS

| | | |
|---|---|---|
| 1,978,647 | Olson et al. | Oct. 30, 1934 |
| 2,544,649 | Bersworth | Mar. 13, 1951 |
| 2,712,558 | Vander Wal et al. | July 5, 1955 |
| 2,739,129 | Manchot | Mar. 20, 1956 |
| 2,796,443 | Meyer et al. | June 18, 1957 |

FOREIGN PATENTS

| | | |
|---|---|---|
| 304,585 | Great Britain | June 20, 1929 |

OTHER REFERENCES

Berichte Deutsche Chemiche Gesellschaft, vol. 30, p. 919 (1897).

Mantell: Adsorption, Chem. Eng. Series, 2nd ed., p. 381 (1951).

Williams et al.: J. Chem. and Physics, vol. 4, p. 251 (1936).

(Copies of above in Patent Office Library.)